(12) United States Patent
Montemurro et al.

(10) Patent No.: US 10,225,745 B2
(45) Date of Patent: *Mar. 5, 2019

(54) METHOD AND APPARATUS FOR CALCULATING A COVERAGE SIGNAL STRENGTH INDICATOR

(71) Applicant: BlackBerry Limited, Warterloo (CA)

(72) Inventors: Michael Peter Montemurro, Mississauga (CA); Khaled Lakhdhar, Atlanta, GA (US); Stephen McCann, Southampton (GB); Lizhong Zhu, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/628,359

(22) Filed: Jun. 20, 2017

(65) Prior Publication Data

US 2017/0353868 A1    Dec. 7, 2017

Related U.S. Application Data

(63) Continuation of application No. 14/473,189, filed on Aug. 29, 2014, now Pat. No. 9,686,690.

(51) Int. Cl.
*H04W 16/18* (2009.01)
*H04B 17/318* (2015.01)
*H04B 17/23* (2015.01)
*H04B 17/373* (2015.01)
*H04W 84/12* (2009.01)

(52) U.S. Cl.
CPC ............ *H04W 16/18* (2013.01); *H04B 17/23* (2015.01); *H04B 17/318* (2015.01); *H04B 17/373* (2015.01); *H04W 84/12* (2013.01)

(58) Field of Classification Search
CPC .... H04B 17/23; H04B 17/318; H04B 17/373; H04W 16/18; H04W 84/12
USPC ...... 455/522, 36, 41.1, 41.2, 73, 435.1, 466, 455/63.1, 456.6, 500, 550.1, 456.3, 414.2, 455/101, 277.1, 437, 226.3, 67.1, 67.7,
(Continued)

(56) References Cited

U.S. PATENT DOCUMENTS 5,689,813 A * 11/1997 Seki .................... H04B 17/327
                                                   340/539.1
6,915,112 B1 * 7/2005 Sutton .................... H04B 1/126
                                                    455/115.3

(Continued)

OTHER PUBLICATIONS

Gast, Matthew, "802.11 Wireless Networks: The Definitive Guide, 2nd Edition," O'Reilly Media Inc.; 2005, pp. 30 and 161.
(Continued)

*Primary Examiner* — Tan H Trinh
(74) *Attorney, Agent, or Firm* — Thomas Grzesik; Fleit Gibbons Gutman Bongini & Bianco P.L.

(57) ABSTRACT

Apparatus and method pertaining to the calculation of at least one value that represents, at least in part, wireless reception signal strength from the perspective of both a local wireless receiver and a remote receiver that receives wireless transmissions from a local wireless transmitter. By one approach the apparatus directly determines the wireless reception signal strength from the perspective of the local wireless receiver and indirectly determines the wireless reception signal strength from the perspective of the remote receiver.

20 Claims, 2 Drawing Sheets

(58) Field of Classification Search
USPC ....... 455/67.4; 370/252, 329, 338, 311, 253, 370/241, 392
See application file for complete search history.

(56) References Cited

U.S. PATENT DOCUMENTS

| | | | | |
|---|---|---|---|---|
| 9,107,220 | B1* | 8/2015 | Sherman | H04W 72/005 |
| 9,686,690 | B2* | 6/2017 | Montemurro | H04W 16/18 |
| 2004/0203472 | A1* | 10/2004 | Chien | H04B 1/30 |
| | | | | 455/68 |
| 2008/0113623 | A1* | 5/2008 | Gormley | H04B 17/318 |
| | | | | 455/67.11 |
| 2008/0318606 | A1* | 12/2008 | Tsutsui | H04B 7/0417 |
| | | | | 455/500 |
| 2011/0065457 | A1* | 3/2011 | Moeglein | G01S 5/021 |
| | | | | 455/456.6 |
| 2011/0206144 | A1* | 8/2011 | Yamamoto | H04L 27/206 |
| | | | | 375/259 |
| 2012/0014347 | A1* | 1/2012 | Tanaka | H04L 1/0007 |
| | | | | 370/329 |
| 2012/0320764 | A1* | 12/2012 | Callender | H04L 41/0896 |
| | | | | 370/252 |
| 2014/0113679 | A1* | 4/2014 | Wehrmann | H04B 1/0458 |
| | | | | 455/550.1 |
| 2014/0269377 | A1* | 9/2014 | Jia | H04L 1/00 |
| | | | | 370/252 |
| 2015/0245358 | A1* | 8/2015 | Schmidt | H04L 43/0888 |
| | | | | 370/329 |

OTHER PUBLICATIONS

RP-111094; Discussions on Carrier Aggregation Across LTE and WI FI; Intel Corporation; 3GPP TSG-RAN Meeting #53 Fukuoka, Japan, Sep. 13-16, 2011; 4 pages.

IEEE Std 802.11-2012; Part 11: Wireless LAN Medium Access Control (MAC) and Physical Layer (PHY) Specifications; The Institute of Electrical and Electronics Engineers, Inc.; Mar. 29, 2012; 2793 pages.

3GPP TS 23.401 v12.1.0; "General Packet Radio Service (GPRS) Enhancements for Evolved Universal Terrestrial Radio Access Network (E-UTRAN) Access (Release 12)," 3GPP Organizational Partners; Jun. 2013; 291 pages.

3GPP TS 36.300 v11.7.0; "Evolved Universal Terrestrial Radio Access (E-UTRA) and Evolved Universal Terrestrial Radio Access Network (E-UTRAN); Overall Description; Stage 2 (Release 11 )," 3GPP Organizational Partners; Sep. 2013; 209 pages.

3GPP TS 33.401 v12.10.0; "3GPP System Architecture Evolution (SAE); Security Architecture (Release 12)," 3GPP Organizational Partners; Dec. 2013; 121 pages.

NTT DOCOMO's Views on LTE Unlicensed, NTT DOCOMO, Inc, Workshop on LTE in Unlicensed Bands, Paris, France, Jan. 21-22, 2014; 13 pages.

Extending the benefits of LTE to unlicensed spectrum, Qualcomm, Workshop on LTE in Unlicensed Bands, Paris, France, Jan. 21-22, 2014; 34 pages.

3GPP RAN#64; RP-140738, "Study Item Proposal on E-UTRAN and WLAN Aggregation," Qualcomm; Sophia Antipolis, France, Jun. 10-13, 2014; 5 pages.

3GPP RAN#64; RP-140739, "Motivation for LTE-WiFi Aggregation," Qualcomm, Sophia Antipolis, France, Jun. 10-14, 2014, 8 pages.

3GPP TS 36.321 v11.4.0; "Evolved Universal Terrestrial Radio Access (E-UTRA); Medium Access Control (MAC) Protocol Specification (Release 11)," 3GPP Organizational Partners; Dec. 2013; 57 pages.

\* cited by examiner

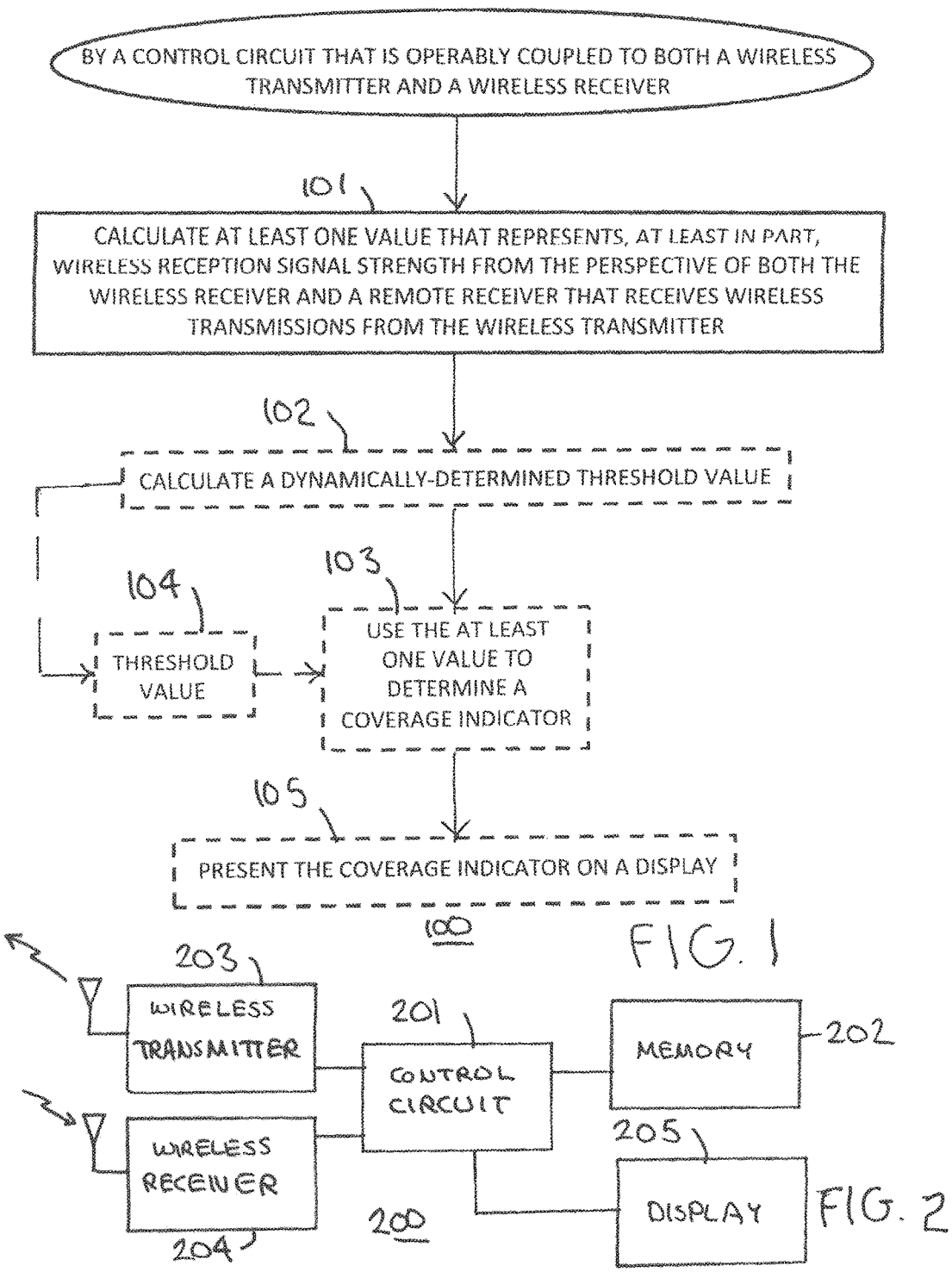

METHOD AND APPARATUS FOR CALCULATING A COVERAGE SIGNAL STRENGTH INDICATOR

FIELD OF TECHNOLOGY

The present disclosure relates to portable electronic devices including devices that communicate with a wireless local area network.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless capabilities.

Portable electronic devices such as PDAs or smart telephones are generally intended for handheld use and ease of portability. Many such devices communicate via a connection to one or more wireless local area networks (WLAN). Examples of a wireless local area network include but are not limited to any of a variety of networks that are based on the Institute of Electrical and Electronics Engineers (IEEE) 802.11 standards (generally known in the art as Wi-Fi™ standards).

Many portable electronic devices provide a visual indication to represent or characterize received signal strength of various in-range wireless local area networks. This Received Signal Strength Indicator (RSSI) is defined in IEEE 802.11-2012 as follows: "The allowed values for the RSSI parameter are in the range from 0 to RSSI maximum. This parameter is a measure by the PHY of the energy observed at the antenna used to receive the current PPDU. RSSI shall be measured during the reception of the PLCP preamble. RSSI is intended to be used in a relative manner, and it shall be a monotonically increasing function of the received power." ("PHY" is an abbreviation for the physical layer of the OSI model. An instantiation of PHY connects a link layer device (often called MAC as an abbreviation for Media Access Control) to a physical medium such as an optical fiber or copper cable. "PPDU" is an acronym for PLCP Protocol Data Unit, where "PLCP" is an acronym for Physical Layer Convergence Protocol.")

Though certainly useful, RSSI does not necessarily consistently serve as an accurate indicator of suitable wireless coverage. For example, wireless interactions with a wireless local area network typically include both transmissions from as well as transmissions to an access point for the wireless local area network. RSSI, however, only represents, to some degree, the signal as received at the portable electronic device. If the access point is not able to receive transmissions from the portable electronic device as well as the latter can receive the transmissions of the former, RSSI at the portable electronic device can provide an overly optimistic characterization of the actual coverage experience.

BRIEF DESCRIPTION OF THE DRAWINGS

FIG. 1 is a flow diagram in accordance with the disclosure.

FIG. 2 is a block diagram in accordance with the disclosure.

DETAILED DESCRIPTION

Figure 3:
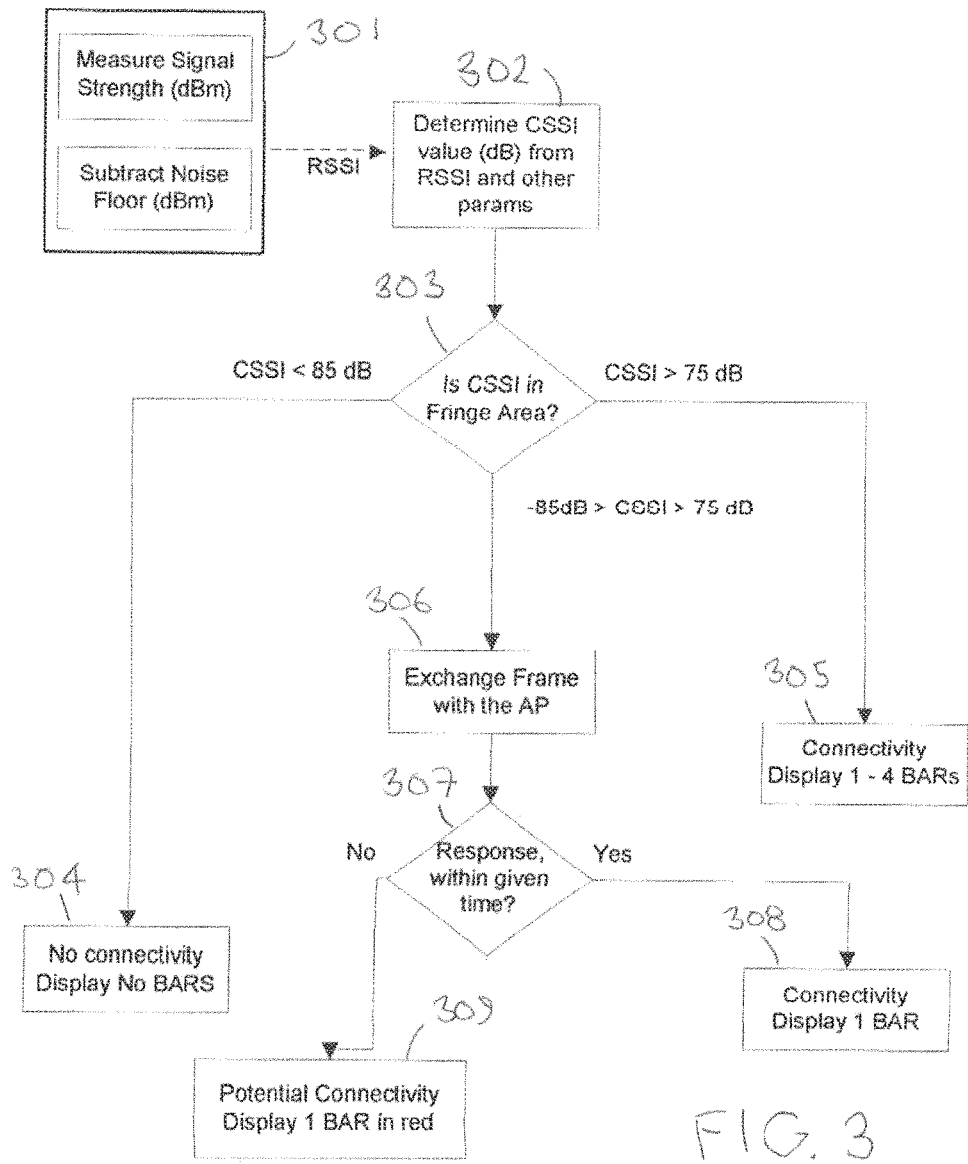
FIG. 3 is a flow diagram in accordance with the disclosure.

The following describes an apparatus and method pertaining to the calculation of at least one value that represents, at least in part, wireless reception signal strength from the perspective of both a local wireless receiver and a remote receiver that receives wireless transmissions from a local wireless transmitter. By one approach the apparatus directly determines the wireless reception signal strength from the perspective of the local wireless receiver and indirectly determines the wireless reception signal strength from the perspective of the remote receiver.

The aforementioned wireless reception signal strength can comprise, for example, wireless local area network reception signal strength. In such a case the remote receiver can comprise a wireless local area network's access point's receiver. The aforementioned calculation can be determined prior to the apparatus attaching to that access point and/or during the course of an attachment.

If desired, the apparatus includes a display. In such a case these teachings will accommodate using the aforementioned at least one value to determine a coverage indicator to present on that display. By one approach the apparatus determines that coverage indicator by, at least in part, accessing a table that contains one or more threshold values. The coverage indicator itself can comprise a simple static or animated graphic element or icon, such as a series of stepped bars.

By one approach the apparatus uses the calculated value to determine the aforementioned coverage indicator by, at least in part, comparing that value to a threshold value. If desired, that threshold value can comprise a dynamically-determined threshold value. For example, such a threshold can be dynamically determined by, at least in part, accessing a corresponding table.

These teachings are highly flexible in practice and will accommodate a variety of approaches and modifications. By one approach, for example, the apparatus calculates the aforementioned at least one value other than as a function of received signal strength. As one example in these regards the apparatus calculates the value as a function, at least in part, of bit error rate. As another example in these regards the apparatus calculates the value as a function, at least in part, of a speed modifier.

So configured, information can be readily developed and communicated to a user regarding the overall coverage experience as regards a portable electronic device and its wireless communications with one or more wireless access points for corresponding wireless local area networks. By communicating information regarding reception from the standpoint of both ends of the communication pathway in an integrated and fused manner, this coverage indicator can greatly help the user to avoid a connection that might lead to unsatisfactory results and in any event can help properly set the user's expectations regarding their coverage experience.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 presents a process 100 that comports with many of these teachings. For the sake of an illustrative example it will be presumed in this description that a control circuit of choice carries out this process 100. Referring momentarily to FIG. 2, in this example the enabling apparatus 200 includes a control circuit 201 that operably couples to a memory. Such a control circuit 201 can comprise a fixed-purpose hard-wired platform or can comprise a partially or wholly programmable platform. These architectural options are well known and understood in the art and require no further description here. This control circuit 201 is configured (for example, by using corresponding programming as will be well understood by those skilled in the art) to carry out one or more of the steps, actions, and/or functions described herein.

The memory 202 may be integral to the control circuit 201 or can be physically discrete (in whole or in part) from the control circuit 201 as desired. This memory 202 can serve, for example, to non-transitorily store the computer instructions that, when executed by the control circuit 201, cause the control circuit 201 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

In this illustrative example the control circuit 201 also operably couples to a wireless transmitter 203 and a wireless receiver 204. In this example these two components cooperate to support communications in a wireless local area network such as, but not limited to, a Wi-Fi network. Such components and their corresponding communications protocols are well understood in the art and require no further explanation here.

Also in this illustrative example the control circuit 201 operably couples to a display 205. These teachings will accommodate any of a variety of known displays. As these teachings are not overly sensitive to any particular choices in these regards, further elaboration here will not be provided regarding displays for the sake of brevity.

The apparatus 200 itself can comprise any of a variety of portable electronic devices including but not limited to so-called smart phones, laptop computers, pad/tablet-styled computers, and so forth.

Referring again to FIG. 1, the control circuit, at block 101, calculates at least one value that represents, at least in part, wireless reception signal strength from the perspective of both the wireless receiver 204 and a remote receiver (as comprises, for example, a part of a wireless local area network access point such as a Wi-Fi access point) that receives wireless transmissions from the wireless transmitter 203. By one approach the control circuit 201 directly determines the wireless reception signal strength from the perspective of the wireless receiver 204 but indirectly determines the wireless reception signal strength from the perspective of the remote receiver (as described in more detail below).

These teachings will accommodate having the control circuit 201 calculate the at least one value other than as a function of received signal strength. By one approach, in a 3GPP system having defined cell re-selection rules that employ a combination of uplink and downlink parameters from network infrastructure to a mobile device, those values can be re-used within a WLAN system to calculate a coverage signal strength indicator (CSSI). If $AP_{sen}$ and $Dev_{sen}$ are defined as AP and device (Dev) receiver sensitivities (dBm), respectively, and if $AP_{TxPwr}$ and $Dev_{TxPwr}$ are defined as AP and device transmit (Tx) powers (dBm), then a necessary and sufficient (NS) condition for reliable communication can be expressed as:

$$AP_{TxPwr} - PL_{AP \to Dev} > Dev_{sen}$$

$$Dev_{TxPwr} - PL_{Dev \to Ap} > AP_{sen}$$

where $PL_{x \to y}$ is the path loss (dB) from one station X to Y (such as the aforementioned portable electronic device—Dev—and/or the access point—AP) to another.

Ideally for WLAN radio systems, $PL_{AP \to Dev} = PL_{Dev \to AP}$ due to the RF symmetric behavior of the medium separating the portable electronic device from the access point.

Although $Dev_{sen}$ and $Dev_{TxPwr}$ are known, $AP_{TxPwr}$ and $AP_{sen}$ will often be manufacturer specific. In some cases these values can vary significantly, as shown in Table 1 below, which are representative figures from commercially available APs. For instance $AP_{TxPwr}$ varies from 15 to 27 dBm while $AP_{sen}$ from −86 to −96 dBm, for IEEE 802.11g operating at 6 Mbps.

TABLE 1

Example WLAN Access Point Parameters

| | Modulation AP - 802.11g - OFDM | | | | | | | |
| --- | --- | --- | --- | --- | --- | --- | --- | --- |
| Data Rate (Mbps) | 6 | 9 | 12 | 18 | 24 | 36 | 48 | 54 |
| RX (dBm) (AP1) | −96.0 | −96.0 | −96.0 | −95.0 | −92.0 | −89.0 | −85.0 | −83.0 |
| RX (dBm) (AP2) | −96.0 | −96.0 | −96.0 | −95.0 | −91.0 | −88.0 | −84.0 | −83.0 |
| RX (dBm) (AP3) | −93.0 | −93.0 | −87.0 | −87.0 | −85.0 | −82.0 | −80.0 | −80.0 |
| RX (dBm) (AP4) | −92.0 | −91.0 | −87.0 | −86.0 | −84.0 | −82.0 | −79.0 | −76.0 |
| RX (dBm) (AP5) | −96.0 | −96.0 | −96.0 | −95.0 | −92.0 | −89.0 | −85.0 | −83.0 |
| RX (dBm) (AP6) | −94.0 | — | — | — | — | — | — | −81.0 |
| RX (dBm) (AP7) | −96.0 | −95.0 | −95.0 | −95.0 | 92.0 | −89.0 | −85.0 | −83.0 |
| RX (dBm) (AP8) | −88.0 | — | — | — | — | — | — | −75.0 |
| RX (dBm) (AP9) | — | — | — | — | — | — | — | −77.0 |
| RX (dBm) (AP10) | −94.0 | −92.0 | −91.0 | −89.0 | −85.0 | −82.0 | −78.0 | −76.0 |
| RX (dBm) (AP11) | −84.0 | −84.0 | −84.0 | −84.0 | −83.0 | −81.0 | −76.0 | −75.0 |
| RX (dBm) (AP12) | −86.0 | −86.0 | −86.0 | −86.0 | −85.0 | −83.0 | −78.0 | −77.0 |
| RX (dBm) (AP13) | −90.0 | −84.0 | −82.0 | −80.0 | −77.0 | −73.0 | −72.0 | −72.0 |
| RX (dBm) (AP14) | −87.0 | −86.0 | −83.0 | −82.0 | −81.0 | −80.0 | −75.0 | −74.0 |
| RX (dBm) (AP15) | −92.0 | −92.0 | −92.0 | −90.0 | −86.0 | −84.0 | −79.0 | −78.0 |

TABLE 1-continued

Example WLAN Access Point Parameters

Modulation
AP - 802.11g - OFDM

| Data Rate (Mbps) | 6 | 9 | 12 | 18 | 24 | 36 | 48 | 54 |
|---|---|---|---|---|---|---|---|---|
| RX (dBm) (AP16) | −93.0 | −93.0 | −92.0 | −90.0 | −87.0 | −85.0 | −80.0 | −79.0 |
| RX (dBm) (AP17) | −91.0 | −91.0 | −91.0 | −90.0 | −87.0 | −85.0 | −80.0 | −78.0 |
| RX (dBm) (AP18) | −92.0 | −92.0 | −92.0 | −90.0 | −86.0 | −84.0 | −79.0 | −78.0 |
| RX (dBm) (AP19) | −92.0 | −92.0 | −92.0 | −90.0 | −86.0 | −84.0 | −79.0 | −78.0 |
| RX (dBm) (AP20) | −91.0 | −91.0 | −91.0 | −90.0 | −87.0 | −85.0 | −80.0 | −79.0 |
| RX (dBm) (AP21) | −92.0 | −92.0 | −92.0 | −88.0 | −84.0 | −81.0 | −74.0 | −74.0 |
| RX (dBm) (AP22) | −87.0 | −87.0 | −85.0 | −82.0 | −79.0 | −76.0 | −71.0 | −70.0 |
| Average Rx (dBm) | −91.5 | −91.1 | −90.1 | −88.6 | −85.7 | −83.3 | −78.9 | −77.7 |
| Worst TX (dBm) | −86.0 | −84.0 | −82.0 | 80.0 | −77.0 | −73.0 | −71.0 | −70.0 |
| TX (dBm) (AP1) | 20.0 | 20.0 | 20.0 | 20.0 | 20.0 | 19.0 | 18.0 | 18.0 |
| TX (dBm) (AP2) | 27.0 | 27.0 | 27.0 | 27.0 | 27.0 | 26.0 | 24.0 | 23.0 |
| TX (dBm) (AP3) | 18.0 | 18.0 | 18.0 | 18.0 | 18.0 | 15.0 | 14.0 | 14.0 |
| TX (dBm) (AP4) | 18.0 | 18.0 | 18.0 | 18.0 | 18.0 | 15.0 | 14.0 | 14.0 |
| TX (dBm) (AP5) | 20.0 | 20.0 | 20.0 | 20.0 | 20.0 | 19.0 | 18.0 | 17.0 |
| TX (dBm) (AP6) | 18.0 | — | — | — | — | — | — | 16.0 |
| TX (dBm) (AP7) | 20.0 | 20.0 | 20.0 | 20.0 | 19.0 | 18.0 | 17.0 | 17.0 |
| TX (dBm) (AP8) | 18.0 | — | — | — | — | — | — | 16.0 |
| TX (dBm) (AP9) | 20.0 | 20.0 | 20.0 | 20.0 | 20.0 | 20.0 | 20.0 | 20.0 |
| TX (dBm) (AP10) | 20.0 | 20.0 | 20.0 | 20.0 | 20.0 | 20.0 | 20.0 | 20.0 |
| TX (dBm) (AP11) | 20.0 | 20.0 | 20.0 | 20.0 | 20.0 | 20.0 | 20.0 | 20.0 |
| TX (dBm) (AP12) | 20.0 | 20.0 | 20.0 | 20.0 | 20.0 | 20.0 | 20.0 | 20.0 |
| TX (dBm) (AP13) | 15.0 | 15.0 | 15.0 | 15.0 | 15.0 | 15.0 | 15.0 | 15.0 |
| TX (dBm) (AP14) | 20.0 | 20.0 | 20.0 | 20.0 | 20.0 | 20.0 | 20.0 | 20.0 |
| TX (dBm) (AP15) | 20.0 | 20.0 | 20.0 | 20.0 | 20.0 | 20.0 | 20.0 | 20.0 |
| TX (dBm) (AP16) | 22.0 | 22.0 | 22.0 | 22.0 | 22.0 | 22.0 | 22.0 | 22.0 |
| TX (dBm) (AP17) | 22.0 | 22.0 | 22.0 | 22.0 | 22.0 | 22.0 | 22.0 | 22.0 |
| TX (dBm) (AP18) | 20.0 | 20.0 | 20.0 | 20.0 | 20.0 | 20.0 | 20.0 | 20.0 |
| TX (dBm) (AP19) | 20.0 | 20.0 | 20.0 | 20.0 | 20.0 | 20.0 | 20.0 | 20.0 |
| TX (dBm) (AP20) | 23.0 | 23.0 | 23.0 | 23.0 | 23.0 | 23.0 | 23.0 | 23.0 |
| TX (dBm) (AP21) | 16.0 | 16.0 | 16.0 | 16.0 | 16.0 | 16.0 | 16.0 | 16.0 |
| TX (dBm) (AP22) | 17.0 | 17.0 | 17.0 | 17.0 | 16.0 | 16.0 | 15.0 | 14.0 |
| Average Rx (dBm) | 19.7 | 19.9 | 19.9 | 19.9 | 19.8 | 19.3 | 18.9 | 18.5 |
| Worst TX (dBm) | 15.0 | 15.0 | 15.0 | 15.0 | 15.0 | 15.0 | 14.0 | 14.0 |

In order to avoid the necessity of characterizing many or even all commercialized access points it may be useful to consider the worst case. The worst case happens when the $AP_{TxPwr}$ is set to a maximum value (such as 27 dBm) while the portable electronic device $Tx_{Pwr}$ is set to a minimum value (for instance, Tx may be cut back—reduced—to meet the Specific Absorption Rate (SAR) requirement and due to band edge emission as shown in Table 2 and Table 3, respectively).

TABLE 2

Example WLAN Tx cut back to meet SAR requirement

| | | Wifi | | | | | |
|---|---|---|---|---|---|---|---|
| DUT A1 | | 2_4G | IEEE Subband 4_34_48 5G_36_64 | IEEE Subband 5_52-64 | IEEE Subband 6_100-116 5G_100_140 | IEEE Subband 7_120-140 | IEEE Subband 8_149-165 5G_149_165 |
| Cellular Status | cellular_bands_none | 19 | 19 | 19 | 19 | 19 | 18 |
| | cellular_gms_850 | 19 | 19 | 19 | 19 | 19 | 18 |
| | cellular_gms_1900 | 17 | 16 | 16 | 16 | 16 | 16 |
| | cellular_gsm_900 | 19 | 19 | 19 | 19 | 19 | 18 |
| | cellular_gsm_1800 | 17 | 16 | 16 | 16 | 16 | 16 |
| | cellular_gsm_band1 | 13 | 13 | 13 | 13 | 13 | 13 |
| | cellular_hapa_band2 | 13 | 13 | 13 | 13 | 13 | 13 |
| | cellular_hapa_band5 | 19 | 19 | 19 | 19 | 19 | 13 |
| | cellular_hapa_band8 | 19 | 19 | 19 | 19 | 19 | 18 |
| | cellular_lte_band1 | 19 | 19 | 19 | 19 | 19 | 18 |
| | cellular_lte_band3 | 19 | 19 | 19 | 19 | 19 | 18 |
| | cellular_lte_band7 | 19 | 19 | 19 | 19 | 19 | 18 |
| | cellular_lte_band8 | 19 | 19 | 19 | 19 | 19 | 18 |
| | cellular_lte_band20 | 19 | 19 | 19 | 19 | 19 | 18 |
| | max improvement | 6 | 6 | 6 | 6 | 6 | 5 |

TABLE 2-continued

Example WLAN Tx cut back to meet SAR requirement

| DUT A1 | | 2_4G | IEEE Subband 4_34_48 5G_36_64 | IEEE Subband 5_52-64 | IEEE Subband 6_100-116 5G_100_140 | IEEE SUBBAND 7_120-140 | IEEE SUBBAND 8_149-165 5G_149_165 |
|---|---|---|---|---|---|---|---|
| Cellular Status | cellular_bands_none | 13 | 13 | 13 | 13 | 13 | 13 |
| | cellular_gms_850 | 13 | 13 | 13 | 13 | 13 | 13 |
| | cellular_gms_1900 | 13 | 13 | 13 | 13 | 13 | 13 |
| | cellular_gsm_900 | 13 | 13 | 13 | 13 | 13 | 13 |
| | cellular_gsm_1800 | 13 | 13 | 13 | 13 | 13 | 13 |
| | cellular_gsm_band1 | 13 | 13 | 13 | 13 | 13 | 13 |
| | cellular_hapa_band2 | 13 | 13 | 13 | 13 | 13 | 13 |
| | cellular_hapa_band5 | 13 | 13 | 13 | 13 | 13 | 13 |
| | cellular_hapa_band8 | 13 | 13 | 13 | 13 | 13 | 13 |
| | cellular_lte_band1 | 13 | 13 | 13 | 13 | 13 | 13 |
| | cellular_lte_band3 | 13 | 13 | 13 | 13 | 13 | 13 |
| | cellular_lte_band7 | 13 | 13 | 13 | 13 | 13 | 13 |
| | cellular_lte_band8 | 13 | 13 | 13 | 13 | 13 | 13 |
| | cellular_lte_band20 | 13 | 13 | 13 | 13 | 13 | 13 |
| | max improvement | 13 | 13 | 13 | 13 | 13 | 13 |

TABLE 3

Example WLAN Tx cut back due to band edge emissions
Band Edge Channels

| | | | | CH | | | | | | | | | | |
|---|---|---|---|---|---|---|---|---|---|---|---|---|---|---|
| | | | | 1 | 2 | 3 | 4 | 5 | 6 | 7 | 8 | 9 | 10 | 11 |
| | | | | | | | | | MHz | | | | | |
| | 802.11 | Mbps | | 2412 | 2417 | 2422 | 2427 | 2432 | 2437 | 2442 | 2447 | 2452 | 2457 | 2462 |
| 2.4 GHz | b | 1 | Design | 18 | 18 | 18 | 18 | 18 | 18 | 18 | 18 | 18 | 18 | 18 |
| | g | 6 | Design | 17 | 18.5 | 18.5 | 18.5 | 18.5 | 18.5 | 18.5 | 18.5 | 18.5 | 18.5 | 16 |
| | n | MCS0 | Design | 16 | 17 | 17 | 17 | 17 | 17 | 17 | 17 | 17 | 17 | 16 |

| | | | | CH | | | | | | | | | | |
|---|---|---|---|---|---|---|---|---|---|---|---|---|---|---|
| | | | | 36 | 40 | 44 | 48 | 52 | 56 | 60 | 64 | 100 | 104 | 108 | 112 |
| | | | | | | | | | | MHz | | | | | |
| | 802.11 | Mbps | | 5180 | 5200 | 5220 | 5240 | 5260 | 5280 | 5300 | 5320 | 5500 | 5520 | 5540 | 5560 |
| 5 GHz | a | 6 | Design | 16 | 16 | 16 | 16 | 18 | 18 | 18 | 18 | 16 | 18 | 18 | 18 |
| | n | MCS0 | Design | 16 | 16 | 16 | 16 | 18 | 18 | 18 | 17.5 | 16.5 | 18 | 18 | 18 |

| | | | | CH | | | | | | | | | | |
|---|---|---|---|---|---|---|---|---|---|---|---|---|---|---|
| | | | | 116 | 120 | 124 | 128 | 132 | 136 | 140 | 149 | 153 | 157 | 161 | 165 |
| | | | | | | | | | | MHz | | | | | |
| | 802.11 | Mbps | | 5580 | 5600 | 5620 | 5640 | 5660 | 5680 | 5700 | 5745 | 5765 | 5785 | 5805 | 5825 |
| 5 GHz | a | 6 | Design | 18 | 18 | 18 | 18 | 18 | 18 | 13.5 | 15 | 18 | 18 | 18 | 18 |
| | n | MCS0 | Design | 18 | 18 | 18 | 18 | 18 | 18 | 13 | 14 | 14 | 14 | 14 | 14 |

In many cases, the uplink is the limiting factor and this fact simplifies the NS condition for reliable communication. As one example in these regards, the control circuit 201 can be configured to calculate the at least one value as a function of:

$$CSSI = \max(AP_{TxPwr}) - [Dev_{TxPwr} - \max(AP_{sen})]$$

where:
CSSI is a Coverage Signal Strength Indicator;
$Dev_{TxPwr}$ comprises a known constant; and
$\max(AP_{TxPwr})$ and $\max(AP_{sen})$ are constants that correspond to a specific model of access point that includes the remote receiver;

such that the calculated coverage signal strength indicator represents, at least in part, a reception imbalance between the wireless receiver and the remote receiver. Accordingly, both downlink and uplink characteristics of the wireless link are considered in the calculations, so that the resulting display on a device provides a better indication of whether both uplink and downlink traffic will be available.

As an illustrative example, if $Dev_{TxPwr}=16.3$ dBm, based on Table 3, for Channel 1 in the 2.4 GHz band at 6 Mbps, then CSSI=27 dBm−[16.3 dBm−(−86 dBm)]=−75.3 dBm.

Tables 1, 2, and 3 can be used to determine the worst case for $AP_{TxPwr}$ and $AP_{sens}$, and for an IEEE 802.11-based wireless local access network this worst case could then be hard-coded into the device equation. In 3GPP, however, the portable electronic device (sometimes denoted as User Equipment or UE in this instance) takes into account the network-signalled limit on its uplink transmit power UE_TXPWR_MAX_RACH; in practice, this is likely to be correlated to the downlink transmit power of the network, RSCP>Qrxlevmin+max(UE_TXPWR_MAX_RACH−P_MAX,0)

where Qrxlevmin and UE_TXPWR_MAX_RACH are signalled in the 3G cell, P_MAX is a UE parameter, and Qrxlevmin is approximately equal to $AP_{sens}$.

This leads to:

RSCP>Qrxlevmin[signalled by network]+UE_TXPWR_MAX_RACH

[signalled by NW]−P_MAX [known by the UE] or using IEEE 802.11 terms:

RSSI>APsens+APtxpwr−Devtxpwr which is the same as the equation shown above for CSSI, rearranged.

The CSSI value can be used by a portable electronic device to replace the original simple RSSI-based lookup table approach. This value is then used to provide an indication on the portable electronic device that could be graphical in nature whereby the graphical representation (such as a bar, spiral, colored icon, or antenna sign) changes as the signal strength changes. This CSSI value can serve in a pre-attached state to assess candidate access points and/or in an attached state to provide the user with helpful information regarding the present wireless coverage.

In some application settings it may be fair to assume that the portable electronic device can suitably monitor the downlink quality using RSSI. For example, in some application settings the RSSI readings may be accurate enough to reflect the actual received WLAN signal strength by the portable electronic device, possibly coupled with use of an averaging algorithm over a given period of time. Presuming that the portable electronic device's sensitivity and Tx power are also known, CSSI can be alternatively be calculated using:

$$CSSI = RSSI - [Dev_{TxPwr} - \min(Dev_{TxPwr})].$$

With continued reference to FIG. 1, and as suggested by blocks 102, 103, and 104, the control circuit 201 can use the at least one value as calculated at block 101 to determine a coverage indicator. By one approach this can comprise comparing the at least one value to a threshold value 104. As represented at block 102 that threshold value 104 can comprise a dynamically-determined threshold value. Such a value might be determined, for example, by accessing a table. Using a dynamically-determined threshold value contrasts greatly in comparison to the ordinary use of fixed thresholds as are often employed with RSSI. The possibility of employing dynamically-determined threshold's may be particularly beneficial when and as MIMO WLAN technology is introduced because WLAN uplink and downlink link budgets can become more unbalanced.

Table 4 shown below presents typical values of the CSSI combined with a WLAN channel number in the 2.4 GHz and 5 GHz bands, which will accommodate a dynamic detection threshold.

TABLE 4

Example CSSI values for WLAN channel numbers
CSSI Configuration Table

| Channel | CSSI |
|---------|------|
| 1 | −85 |
| 2 | −86 |
| 3 | −87 |
| 4 | −86 |
| 5 | −87 |
| 6 | −87 |
| 7 | −87 |
| 8 | −87 |
| 9 | −87 |
| 10 | −87 |
| 11 | −85 |
| 12 | −83 |
| 13 | −83 |
| 36 | −84 |
| 40 | −84 |
| 44 | −84 |
| 48 | −84 |
| 52 | −86 |
| 56 | −86 |
| 60 | −86 |
| 64 | −86 |
| 100 | −87 |
| 104 | −87 |
| 108 | −87 |
| 112 | −86 |
| 116 | −86 |
| 120 | −86 |
| 124 | −86 |
| 128 | −86 |
| 132 | −86 |
| 136 | −87 |
| 140 | −82 |
| 149 | −84 |
| 153 | −87 |
| 157 | −87 |
| 161 | −86 |
| 165 | −86 |

When the portable electronic device is in an unassociated state, the Table 4 threshold can be used to determine whether an access point is a candidate access point or not. When the portable electronic device is in an associated state, the Table 4 threshold can be tied to a link quality algorithm. When the link quality drops below the indicated threshold, an action can be triggered to re-assess the channel condition. Radio access technology (RAT) re-selection or AP transition can also responsively occur as such an action.

When the CSSI level is lower than this Table 4 threshold, either an alternate CSSI equation can be used or another different mechanism can be selectively triggered and employed to better estimate the channel condition.

At block 105 the control circuit 201 can present the previously determined coverage indicator on a display 205. As one illustrative example in these regards, the CSSI can be used to display various bars on the display 205 to indicate various levels of radio coverage. Various examples in these regards are presented in Table 5 shown below, where DevTxPwr is the device Tx power level.

TABLE 5

Example CSSI indicators based on CSSI values

| QoS | CSSI |dBm) | | CSSI Indication |
|-----|------|---|-----------------|
| Excellent | −50 | −60 | 📶 |
| Good | −61 | −70 | 📶 |
| Fair | −71 | −60-DevTxPwr | 📶 |

TABLE 5-continued

Example CSSI indicators based on CSSI values

| QoS | CSSI |dBm) | | CSSI Indication |
|---|---|---|---|
| Poor | −61-DevTxPwr | −85 | • If ACK received |
|  | −61-DevTxPwr | −85 | ■ If not |
| Very poor | −86 | −90 |  |

FIG. 3 presents one illustrative example in the foregoing regards. In this particular approach the control circuit 201, at block 301, measures received signal strength and subtracts the noise floor to determine the corresponding RSSI. At block 302 the control circuit 201 then determines a CSSI value using that RSSI information and other parameters as per these teachings.

At decision block 303 the control circuit essentially determines whether the portable electronic device is in a fringe area. In particular, when CSSI is less than 85 dB, the control circuit 201 categorizes the coverage situation as representing no connectivity at block 304 and the corresponding display can present no bars. (As noted above these teachings are highly flexible in practice and will accommodate a variety of modifications as desired. As one example, in lieu of representing no connectivity at block 304 (or in combination therewith) the device can instead modify the forwarding/routing table within the device's IP stack to use another available network interface on a multi-homed device (that is, a dual-mode cellular/WLAN smartphone). As another example, an application on the device that is using WLAN could be signaled to indicate to that application that such communications are presently unreliable. And as yet another example a WLAN connection manager component in the device could autonomously and automatically disconnect the device from the WLAN.)

When CSSI is greater than 75 dB, the control circuit 201 acknowledges the connectivity state at block 305 and a corresponding number of bars can be displayed depending upon the overall strength of that coverage.

When the CSSI value falls between the aforementioned thresholds, at block 306 the control circuit exchanges a frame with the access point and then determines, at decision block 307, whether the access point responded within a particular given amount of time. For a portable electronic device in an unassociated state, the frames to be exchanged with the access point can include any of a probe request/response (e.g. active scans), an ANQP request/response, and other management frames as desired (any IEEE 802.11 data or management frame that requires a response from the wireless local area network via the access point will likely serve well in these regards). For a portable electronic device in an associated state, the frames to be exchanged with the access point can include any of those noted above and additionally any appropriate upper layer messages such as Ping.

If true, at block 308 the control circuit 201 acknowledges connectivity and displays one and only one bar. If false, at block 309 the control circuit 201 acknowledges potential connectivity and displays one bar and only one bar using a different color (or any other different type of indication as may be desired to show this particular state) than is ordinarily used to present connectivity bars. For example, if connectivity bars are ordinarily presented using a black color, then the potential connectivity bar can be displayed using a red color. (If desired, instead of employing the potential connectivity approach when the response is not received within the predetermined timeframe, the control circuit 201 can instead employ block 304 to confirm a no connectivity state.)

As noted above, these teachings are highly flexible in practice. As one example in these regards, these teachings will accommodate determining CSSI as a function other than of RSSI. By one approach, for example, one can substitute received bit error rate (BERrx) for RSSI. Although RSSI is not directly proportional to BERrx, there often nevertheless exists a reasonable correlation. In this case:

$$CSSI=BERrx-[Dev_{TxPwr}-min(Dev_{TxPwr})]$$

or alternatively:

$$CSSI=Log(BERrx)-[Dev_{TxPwr}-min(Dev_{TxPwr})]$$

When a portable electronic device has a high relative motion to an access point, a high RSSI may still not be necessarily an indication of reliable communication. This is because the portable electronic device may pass by the access point quickly, so that a high RSSI at the time of measurement may nevertheless quickly reduce. The corresponding speed modifier can help to condition the user's expectation of WLAN connectivity in this situation. In particular:

$$CSSI=RSSI-[Dev_{TxPwr}-min(Dev_{TxPwr})]-kDev_V$$

where $Dev_V$ is the speed of the portable electronic device relative to the access point and k is a modifying factor. This speed could be determined from successive time of flight measurements, GPS, or similar approaches as desired. For example, this modifying factor may be set in a portable electronic device so that at 30 km/h the control circuit 201 would remove one bar from the display to indicate a less reliable communication.

As another example of an alternative approach, one can substitute the RSSI for the difference between the downlink data rate and the uplink data rate. In an IEEE 802.11 implementation, the data rate selection algorithm will select a data rate that correlates with the measured link quality. That selected data rate can then be used to create a modified CSSI.

The coverage signal strength indicator (CSSI) proposed herein for WLAN devices takes into account both uplink and downlink radio parameters and can be used to provide a valuable indication of radio link quality on the display of a user's portable electronic device.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A computer program product comprising a non-transitory computer readable storage medium having program instructions embodied therewith, the program instructions executable by a control circuit of an electronic device that is operably coupled to both a wireless transmitter and a wireless receiver of the electronic device to cause the electronic device to:

calculate at least one value that represents, at least in part, wireless reception signal strength from the perspective of both the wireless receiver with respect to one or more successful wireless transmissions received by the wireless transmitter from a remote transmitter, and a remote receiver with respect to one or more successful wireless transmissions from the wireless transmitter, wherein the remote transmitter and the remote receiver are part of the same device, and wherein the at least one value is a calculated coverage signal strength indicator (CSSI) representing, at least in part, a reception imbalance between the wireless receiver and the remote receiver.

2. The computer program product 1, wherein the program instructions further cause the electronic device to:
   directly determine the wireless reception signal strength from the perspective of the wireless receiver; and
   indirectly determine the wireless reception signal strength from the perspective of the remote receiver.

3. The computer program product 1, wherein the program instructions further cause the electronic device to:
   calculate the at least one value prior to the electronic device attaching to an access point that includes the remote receiver.

4. The computer program product of claim 1, wherein the program instructions further cause the electronic device to:
   use the at least one value to determine a coverage indicator; and
   present the coverage indicator on a display.

5. The computer program product of claim 4, wherein the coverage indicator is determined by, at least in part, comparing the at least one value to a threshold value to determine a fringe coverage state.

6. The computer program product of claim 5, wherein upon determining the fringe coverage state the program instructions further cause the electronic device to:
   activate at least one of:
      an active scan;
      a management frame; and
      an access network query protocol request;
   to verify presence of a link to an access point.

7. The computer program product of claim 6, wherein the program instructions further cause the electronic device to:
   disconnect from a currently attached wireless local area network when unable to verify the presence of the link to the access point; and
   re-scan for another wireless local area network.

8. The computer program product of claim 4, wherein the program instructions further cause the electronic device to use the at least one value to determine the coverage indicator by, at least in part, accessing a table containing threshold values.

9. The computer program product of claim 4, wherein the program instructions further cause the electronic device to by, at least in part, comparing the at least one value to a threshold value.

10. The computer program product of claim 9, wherein the threshold value comprises a dynamically-determined threshold value.

11. The computer program product of claim 10, wherein the program instructions further cause the electronic device to:
   dynamically determine the dynamically-determined threshold value by, at least in part, accessing a table.

12. The computer program product of claim 1, wherein the program instructions further cause the electronic device to calculate the at least one value as a function of:

$$CSSI = \max(AP_{TxPwr}) - [Dev_{TxPwr} - \max(AP_{sen})]$$

where:
   $Dev_{TxPwr}$ comprises a known constant; and
   $\max(AP_{TxPwr})$ and $\max(AP_{sen})$ are constants that correspond to a specific model of access point that includes the remote receiver.

13. The computer program product of claim 12, wherein the program instructions further cause the electronic device to calculate the at least one value as a function, at least in part, at least one of:
   bit error rate; and
   a speed modifier.

14. The computer program product of claim 1, wherein the program instructions further cause the electronic device to calculate the at least one value other than as a function of received signal strength.

15. An apparatus comprising:
   a wireless transmitter;
   a wireless receiver;
   a control circuit operably coupled to both the wireless transmitter and the wireless receiver and configured to:
   calculate at least one value that represents, at least in part, at least one of a speed modifier and received bit error rate from the perspective of both the wireless receiver with respect to one or more successful wireless transmissions received by the wireless transmitter from a remote transmitter, and a remote receiver with respect to one or more successful wireless transmissions from the wireless transmitter, wherein the remote transmitter and the remote receiver are part of the same device, and
   wherein the at least one value is a calculated coverage signal strength indicator (CSSI) representing, at least in part, a reception imbalance between the wireless receiver and the remote receiver.

16. The apparatus of claim 15, further comprising:
   a display operably coupled to the control circuit;
and wherein the control circuit is further configured to:
   use the at least one value to determine a coverage indicator to present on the display.

17. The apparatus of claim 15, wherein the control circuit is configured to calculate the at least one value as a function of:

$$CSSI = \max(AP_{TxPwr}) - [Dev_{TxPwr} - \max(AP_{sen})]$$

where:
   $Dev_{TxPwr}$ comprises a known constant; and
   $\max(AP_{TxPwr})$ and $\max(AP_{sen})$ are constants that correspond to a specific model of access point that includes the remote receiver.

18. A method comprising:
   by a control circuit of a portable electronic device that is operably coupled to both a wireless transmitter and a wireless receiver of the portable electronic device:
   calculating at least one value that represents, at least in part, received bit error rate from the perspective of both the wireless receiver with respect to one or more successful wireless transmissions received by the wireless transmitter from a remote transmitter, and a remote receiver with respect to one or more successful wireless transmissions from the wireless transmitter, wherein the remote transmitter and the remote receiver are part of the same device, and wherein the at least one value is a calculated coverage signal strength indicator (CSSI) representing, at least in part, a reception imbalance between the wireless receiver and the remote receiver.

19. The method of claim 18, further comprising:
using the at least one value to determine a coverage indicator;
presenting the coverage indicator on a display.

20. The method of claim 18, wherein calculating the at least one value comprises calculating the at least one value as a function of:

$$CSSI = \max(AP_{TxPwr}) - [Dev_{TxPwr} - \max(AP_{sen})]$$

where:
$Dev_{TxPwr}$ comprises a known constant; and
$\max(AP_{TxPwr})$ and $\max(AP_{sen})$ are constants that correspond to a specific model of access point that includes the remote receiver.

* * * * *